Figure 1:
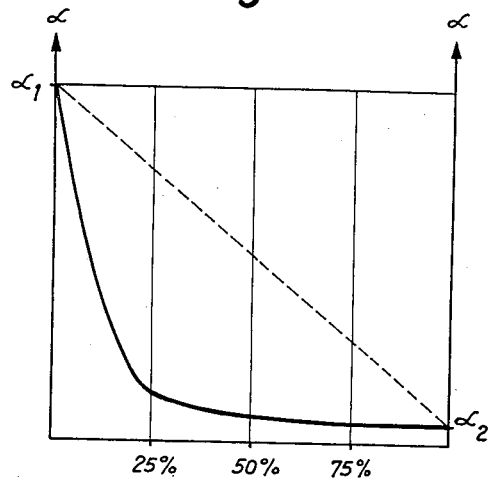

Feb. 13, 1962 W. BETHGE 3,021,243
METHOD OF PRODUCING A DURABLE MECHANICAL BOND
BETWEEN GLASS AND ANOTHER MATERIAL
Filed Dec. 5, 1956

INVENTOR.
Walter Bethge
BY

United States Patent Office 3,021,243
Patented Feb. 13, 1962

3,021,243
METHOD OF PRODUCING A DURABLE MECHANICAL BOND BETWEEN GLASS AND ANOTHER MATERIAL
Walther Bethge, 5 Rue de Soleure, Moutier/J.B., Switzerland, assignor of one-third to Jean Pierre de Montmollin, and one-third to René Gugger, Neuchatel, Switzerland
Filed Dec. 5, 1956, Ser. No. 626,505
Claims priority, application Switzerland Aug. 27, 1956
3 Claims. (Cl. 156—272)

The present invention relates to a method of producing a durable mechanical bond between glass and another material, and more particular to a method of producing a durable mechanical bond between glass and metal. Further, this invention relates to a method of fabricating multiple glass sheet units.

In many applications of glass it is necessary hermetically to seal the glass to a structure such as a frame, the connection between the frame and the glass being required to be durable within a comparatively large pressure and temperature range depending on the climatic conditions and, on the other hand, to be so designed that practically no water vapour can diffuse through the bond during extended periods. These extreme conditions are, by way of example, to be considered in the manufacture of multiple glass sheet units since temperature and pressure differentials occur between the inside of the window and the atmosphere which the glass and the bond must be able to withstand.

Various efforts have been directed at producing a bond meeting the said conditions but not all requirements have been answered. It is, by way of example, known to adjust the glass and the frame or, in the case of multi-pane assemblies, the spacer member formed, e.g. of lead alloys, in such a manner that a sufficient stability is obtained at least within a mean temperature range. In this process, copper was sprayed on the glass, deoxidized and subsequently soldered together with the tinned lead member. This, however, required temperatures of approximately 200° C. The lead alloys were so selected that the alloy would be adaptable—although only to a limited extent—thanks to its plasticity. Proposals have also been made largely to adjust the coefficient of expansion of the alloy to that of glass by further additions.

The high fabricating temperatures encountered, by way of example, when soldering, cause damage in the form of fine cracks so that a substantial quantity of material is wasted even if manufacture is effected carefully.

It has also been suggested to bond the glass to the metal by means of enamel. This, however, requires exceptionally high temperatures at which considerable detrimental thermal tension occurred, which prevented the proposal to be applied in practice.

As shown above, it is extremely difficult to produce a bond between glass and e.g. metal suitable for the extreme requirements made. For this reason, solutions have been adopted which comprise, by way of example, an outer metal frame which assumes the structural support of the panes while the function of the seal is assumed by a substance embedding the area of the joint which does not, however, participate in the supporting of the pane. With this solution it was not possible to obtain vapour-tight seal answering all requirements, and a drying agent had to be incorporated within the double pane.

For the said reasons it has not so far been possible to put into practice the solution, known as such, of combining two or more panes by means of elastic spacer rails in such a manner as to form a hermetically sealed space between the said two or more panes.

It is, therefore, one object of this invention to provide a process of producing a bond between glass and another solid material, which bond is durable when subjected to high temperatures, low pressures and external forces.

It is another object of this invention to provide a process of producing a bond between glass and metal, which bond is durable when subjected to high temperatures, low pressures, external forces and which is vapour-tight at a high degree.

A further object of this invention is to provide a bond material for the use between glass and another material, which bond material has a thermal expansion coefficient which is within the range of the thermal expansion coefficients of glass and metals.

It is another object of this invention to provide a method of fabricating a multiple glass sheet unit, which unit is able to withstand high and low temperatures and pressures.

According to one aspect of this invention, the method may be characterized by the fact that a bonding material is inserted between the glass and said other material, for example, a metal. The bonding material is a synthetic substance which is at least partly organic, impervious to water vapour and non-thermoplastic, and has its water content and the content of substances boiling below 100° C. reduced to less than 0.1 percent by weight. After the material is inserted between the other material and the glass it will be hardened at a temperature of not more than 150° C.

Further objects, advantages and features of the invention will be apparent from the following description taken in conjunction with the drawings, wherein FIG. 1 is a diagram showing the thermal expansion coefficient as a function of the ratio of components.

Figure 2:
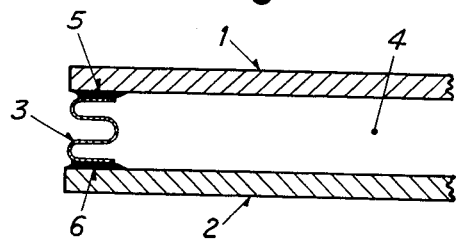

FIG. 2 is a sectional view of a multiple glass sheet unit.

Organic plastics could not be used as bonding materials so far as they do not possess sufficiently high adhesion to glass. Moreover, they were unsuitable owing to their high coefficients of expansion and brittleness. But if certain synthetic materials which, on one hand, have a low transmission factor as regards water vapour and which, on the other hand, will not become plastic under the action of heat, are freed almost completely from water, water-yielding substances and from substances evaporating at normal temperatures, such materials will acquire a high adhesion to glass. Preferably a suitable organic synthetic substance is freed from water in a vacuum sufficiently for the water content to drop below .1 percent by weight while the material is unhardened, i.e. soft. The plastic so treated is equipped with a suitable hardener, arranged between the pane and a further material and hardened at temperatures not exceeding 150° C.

As mentioned above, synthetic materials are used for this purpose which, when hardened, have a very low water vapour transmission, which are not thermoplastic and will not absorb water when hardened. The material should preferably have a relatively low coefficient of expansion and be slightly elastic when hardened. These properties are usually not present in combination in the known synthetic materials but may be obtained by suitable compounding.

By way of example, the base materials may be epoxy-resins or phenol derivatives which become largely brittle, however, on hardening and have a relatively high hardening temperature. Furthermore, the said materials are at first unsuitable because they transmit traces of water vapour. If these substances are mixed individually or in combination with a hardener, the most unfavourable properties can be largely compensated. The hardener or hardeners must contain only traces of water and highly volatile substances, must reduce the hardening temperature and increase vapour resistance. Materials suitable for this purpose are polyamides, Neoprene or the substance known under the trade name Thiokol. These substances considerably lower the hardening temperature and give the final product a high degree of imperviousness to water vapour.

The components employed are mixed and largely freed from water and water-releasing substances, by way of example by agitation in vacuo, and applied to the glass. The further material to which the glass is to be bonded is then applied to the compound and slightly pressed. Hardening of the bonding material is effected in conformity with the substance used at a temperature between 50 and 150° C., preferably at a temperature of approx. 70 or 80° C.

When applying heat, the formation of thermal stresses should be avoided so as to prevent the bonding material from setting while the glass is irregularly expanded so that the glass will not break when subjected to additional stresses in actual use. Care should also be taken to avoid a condition in which the glass covered by the bonding material is colder than the bonding material as the evaporating components of the bonding material during hardening would be deposited on the glass, which would impair transparency of the latter.

These two conditions during the application of heat can be met by heating by means of infra-red radiation. It is known that almost all glass types suitable therefor very substantially absorb infra-red rays. If a glass pane partly covered with bonding material is subjected to infra-red radiation, the glass heats very rapidly in comparison with other bodies so that it will at all times possess a temperature somewhat higher than adjacent elements. This temperature is transmitted to the bonding material which is accordingly indirectly heated and hardened. In order to prevent all heating of the bonding material, the latter may be protected against infra-red radiation or be coated with a layer reflecting infra-red rays.

When the method is applied to double or multi-pane assemblies, provision must be made for all panes to warm evenly since the complete unit will otherwise warp owing to irregular expansion. This condition may be obtained by providing a layer reflecting infra-red radiation below the lowermost pane where infra-red radiation is effected from above, which layer reflects sufficient radiation to ensure the same supply of thermal energy to the lowermost pane as to the top pane.

As is well known, all organic plastics usually possess a coefficient of expansion considerably higher than that of glass. A durable bond between glass and a further material, such as a frame formed of metal, can—if the assembly is to be subjected to various temperatures—be achieved only if both substances possess largely the same coefficient of expansion. In the case named, however, the bonding material between the two must possess a coefficient of expansion of the same magnitude if the formation of cracks in the bonding material is to be prevented e.g. in the event of excessive cooling. Such cracks would destroy the hermetic seal. On the other hand, synthetic substances as a rule possess a considerably higher coefficient of expansion than glass so that they may first be used only where requirements in respect of the temperature range are moderate. This difficulty may be overcome by adding a substance to the synthetic material which substantially lowers its coefficient of expansion. Materials suitable for this purpose are mainly inorganic crystals in powder form, such as aluminum oxide.

To illustrate the above, a number of coefficients of expansion for temperatures ranging between 0° and 100° are given in the table below in magnitudes of $10^{-6}$:

| | |
|---|---|
| Synthetic materials | 80–160 |
| Glass | 8–10 |
| Lead | 29 |
| Steel, drawn | 10–11.5 |
| Quartz, melted | .5–1.3 |
| Graphite | 5–6 |
| Titanium dioxide | 3–6 |
| Mica | 3 |
| Epoxyresin, pure | 60 |
| Mixture of titanium dioxide, quartz, mica and/or graphite and epoxyresin | 11–16 |

It has been found that, with a mixing ratio between an inorganic crystal powder and a synthetic material, the coefficient of expansion does not develop proportionately to the mixing ratios involved but deviates from a straight line relationship. These conditions are shown in the diagram of FIG. 1. The coefficient of expansion $d_1$, by way of example, corresponds to the pure synthetic material employed, while the coefficient of expansion $d_2$ corresponds to the pure inorganic crystal. As shown by the course of the curve, addition of approximately 20% of the inorganic crystal powder enables the coefficient of expansion of the compound material to be substantially reduced.

The coefficient of expansion of the compound is now in the neighborhood of that of metal and glass. Small deviations will not be of great importance because the insignificant thermal stresses can largely be absorbed by the bonding material by virtue of its elasticity. In many tests no breakage has occurred owing to thermal stresses, and the bond has remained tight in temperature tests down to −60° C. Application of inorganic crystals in the bonding material, however, secures further advantages besides the lowering of the coefficient of expansion. The micro-crystals, as experiments have revealed, largely fill all cavities formed in the bonding material. This causes the perviousness to water vapour of the bonding material to be substantially reduced. In respect of organic synthetic materials with additions of titanium dioxide or mica etc. it may be assumed that practically no water vapour will diffuse through the synthetic material.

Apart from an increase in adhesion to glass as has experimentally been proved, the use of titanium dioxide secures a further important advantage in a thermal hardening treatment by means of infra-red radiation. As has already been stated, infrad-red radiation is designed in the first place to act upon the glass so that the bonding material is heated indirectly for hardening. In order to avoid direct action of radiation on the bonding material, the latter must be screened out. When titanium dioxide is used as an inorganic crystal addition, screening may be dispensed with since titanium oxide strongly reflects infra-red radiation so that heating of the material owing to direct radiation is insignificant.

The method will now be described in conjunction with a practical application. As is well known, the so-called multiple glass sheet units have gained wide application of late. At least two panes 1 and 2 (FIG. 2) are held at a certain distance from one another around their entire circumference by spacer members 3. The members are preferably connected with the panes in such a manner that two adjacent panes form a hermetically sealed space 4 betwen them. The said space acts as thermal and sound insulation. The spacer members are preferably formed of section steel bands as shown in FIG. 2. These steel bands possess a certain elasticity normal to the pane plane so that the distance between the panes can adjust itself to the exterior atmospheric pressure within a wider range and the panes will not be under excessive stress at very high or very low pressures. With panes of this type it is of the greatest importance that the connections 5 and 6 between the glass and the metal bands will not allow water vapour to pass because vapour entering the space would condense on the pane when the latter is considerably cooled, and thus obstruct the view. On the other hand, the hermetic seal must not be detrimentally affected by considerable temperature drops. The use of multi-pane assemblies of the type described has been possible so far to a limited extent only since no connection between the section frame and the glass has become known which would have satisfactorily answered the said requirements. In the application of the method according to this invention, a bond is obtained that will largely meet all requirements.

The following composition of the bonding material may be employed, indications referring to percent by weight of the aggregate material:

| | Percent |
|---|---|
| Epoxy-resin | 40 |
| Polyamide | 30 |
| Titanium dioxide | 22 |
| Powdered quartz | 8 |

As stated above, the polyamide acts as a hardener. The mixture was thoroughly agitated mechanically, partly in vacuo, and applied to the edges of the panes. Subsequently the frame assembled by soldering was applied to one pane and the adjacent pane laid on the frame etc. The panes were then subjected to radiation from an infrared source during 40 to 50 minutes, the bonding material reaching a temperature of 70–80° C. Owing to the favourable reflecting action of the bonding material, no screening was necessary. The bonding material was hardened completely but retained the elasticity necessary to absorb the forces caused by thermal expansion. It was found in tensile tests that the bonding material possesses an adhesion of 2–3 kg./mm.$^2$. In all tensile tests the bonding material was not damaged while the glass broke out in the areas covered by the bond. A test for vapour permeability showed that noticeable traces of water vapour can permeate through the bond after a period corresponding to approximately 30 years. The multi-pane assemblies produced as disclosed above also possessed good heat insulation, i.e. the connecting layer does not act as a heat bridge. Only by this intermediate layer consisting of synthetic material impervious to water vapour has it become possible to employ elastic spacers, particularly formed of metal, while retaining a hermetic seal with the panes.

Having now particularly described and ascertained the nature of my said invention and in what manner the same is to be performed, I declare that what I claim is:

1. A method of producing a durable mechanical bond between glass and metal comprising the steps of: distilling in a vacuum a thermosetting organic synthetic substance containing vaporizable substances to reduce the content therein of all substances boiling at a temperature below 100° C. to a content of less than 0.1% by weight, intermixing therewith an inorganic substance having a low coefficient of thermal expansion than said organic substance, thereupon introducing said mixture between said glass and said metal, and while said content of vaporizable substances is thus reduced exposing said glass to infra-red radiation to raise the temperature of said glass, and thereby, and by conduction of heat through and from said glass heat said mixture to a hardening temperature upward to 150° C.

2. A method of producing a durable mechanical bond between glass and another material comprising the steps of: reducing the water content of a water-containing, thermosetting organic synthetic substance comprising 40% of epoxy resin, 30% of polyamide and 22% of titanium dioxide to less than 0.1% by weight, stirring the thus obtained mixture in a vacuum, adding 8% of powdered quartz to the thus obtained mixture, thereupon inserting the organic substance thus obtained as a layer between the glass and said other material, and while said water content is thus reduced exposing said glass to infra-red radiation to raise the temperature of said glass, and thereby, and by conduction of heat through and from said glass, heating said layer of thermosetting substance upward to 150° C.

3. A method of producing a durable mechanical bond between glass and metal comprising the steps of: distilling in a vacuum a thermosetting organic synthetic substance containing vaporizable substances to reduce the content therein of all substances boiling at a temperature below 100° C. to a content of less than 0.1% by weight, intermixing titanium dioxide with said organic substance thereupon introducing said mixture between said glass and said metal, and while said content of vaporizable substance is thus reduced exposing said glass to infra-red radiations to raise the temperature of said glass, and thereby, and by conduction of heat through and from said glass heating said mixture to a hardening temperature upward to 150° C.

References Cited in the file of this patent

UNITED STATES PATENTS

| | | |
|---|---|---|
| 1,873,776 | McNeil et al. | Aug. 23, 1932 |
| 1,925,999 | De Giers | Sept. 5, 1933 |
| 2,302,332 | Leekley | Nov. 17, 1942 |
| 2,303,151 | Watkins et al. | Nov. 24, 1942 |
| 2,379,220 | Englehart | June 26, 1945 |
| 2,512,996 | Bixler | June 27, 1950 |
| 2,575,558 | Newey | Nov. 20, 1951 |
| 2,671,746 | Brew | Mar. 9, 1954 |
| 2,694,694 | Greenlee | Nov. 16, 1954 |
| 2,705,223 | Renfrew et al. | Mar. 29, 1955 |
| 2,707,177 | Skiff et al. | Apr. 26, 1955 |
| 2,707,708 | Wittcoff | May 3, 1955 |
| 2,708,774 | Seelen | May 24, 1955 |
| 2,725,319 | Tarnopol | Nov. 29, 1955 |
| 2,746,102 | Engelhart et al. | May 22, 1956 |
| 2,879,252 | Been et al. | Mar. 24, 1959 |

OTHER REFERENCES

Modern Plastics, "Alloying With Epoxies," pages 155–157, 160–161 and 240–241.

Electrical Manufacturing, July 1949, pages 79–81, 164 and 166 (page 79 relied on).